J. A. HOLIFIELD.
ARC CURRENT REGULATOR.
APPLICATION FILED JUNE 18, 1919.
1,338,301.
Patented Apr. 27, 1920.
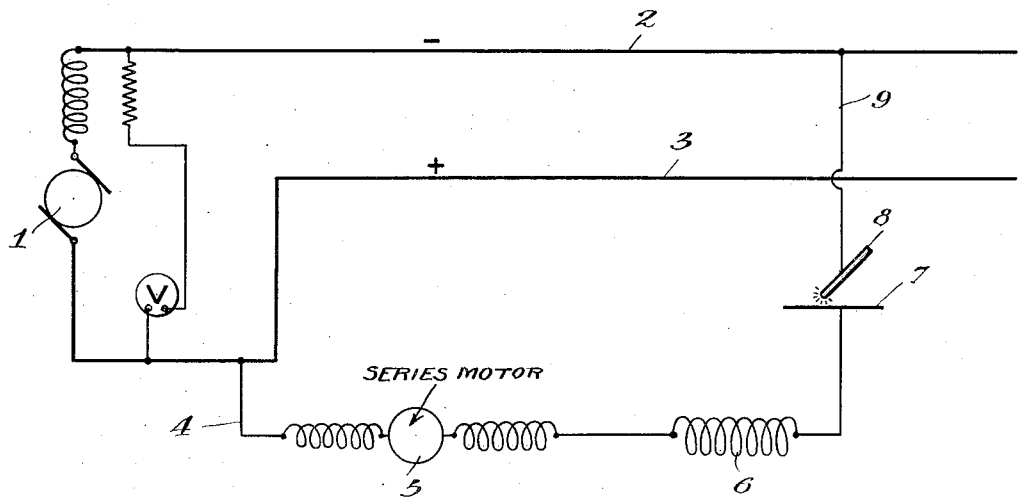
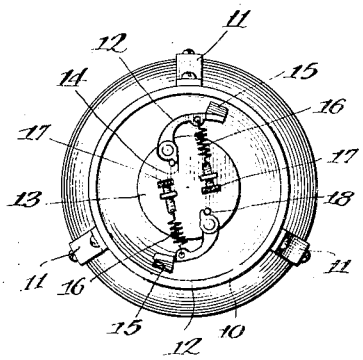
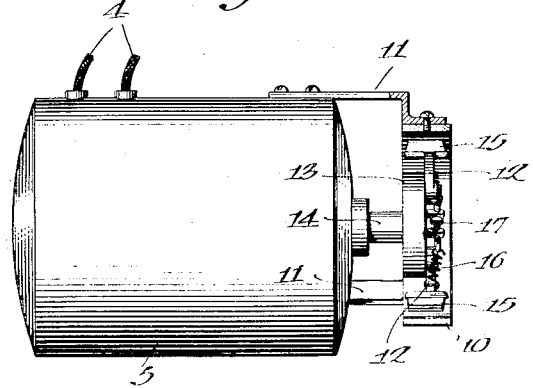
WITNESSES
J. A. Holifield, INVENTOR:
BY
ATTORNEYS

UNITED STATES PATENT OFFICE.

JOSEPH ANDREW HOLIFIELD, OF MOBILE, ALABAMA.

ARC-CURRENT REGULATOR.

1,338,301.　　　Specification of Letters Patent.　　Patented Apr. 27, 1920.

Application filed June 18, 1919. Serial No. 304,988.

*To all whom it may concern:*

Be it known that I, JOSEPH A. HOLIFIELD, a citizen of the United States, and a resident of Mobile, in the county of Mobile and State of Alabama, have invented certain new and useful Improvements in Arc-Current Regulators, of which the following is a specification.

My invention is an improvement in arc current regulators and has for its object to maintain a substantially constant current within the limits of voltage desired for the arc in question.

It is my purpose to accomplish this regulation by interposing in the arcing circuit an electrical agency for the generation of a counter E. M. F. to buck current from the main through the arcing circuit in such manner that the current flow to the arc is maintained substantially constant. My preferred means to this end is a series wound motor with its field and armature in series with the arcing circuit in combination with means to brake the speed of the motor so that it will not become excessive when the arcing circuit is closed or the arc is being drawn. This braking means is preferably designed so that under normal arcing conditions it is under light duty and then represents no appreciable current loss.

My invention is of peculiar value in the are of electrical welding as it is adapted to maintain an approximately constant current in the arcing circuit at all times without the presence of dead resistances or power wasting devices and this constant current will function in an ideal manner to make a weld without burnt places, globules, or pitting which results from variations in the current.

My invention can be embodied in a simple portable outfit comparatively inexpensive and very economical in operation and can be incorporated in a number of welding circuits, all of which can be derived from one source of power and yet each welding circuit will be independent of the other welding circuits.

In the drawings:

Figure 1 is a diagrammatic view of the improved welding circuit;

Fig. 2 is an end view of the series motor;

Fig. 3 is a side view of the same.

I have illustrated my invention as applied to the electric welding art, the welding arc circuit being typical of any other arcing circuit.

In the present embodiment of the invention, 1 is a direct current dynamo with leads 2 and 3 to electrical circuits. The welding circuit is taken from the positive lead 3 through a conductor 4 to the series coils of a series motor 5. From this motor it is led to a current stabilizer 6, in the present instance a choke coil, and from the choke coil it passes to the work, indicated at 7. The metal electrode 8 is connected to the negative lead by a conductor 9.

The action of the combination is as follows: When the metal electrode 8 is not in electrical contact with the work 7, no current flows through the welding circuit. When, however, the electrode 8 is attached to the work, preparatory to drawing an arc, current flows through the welding circuit, the motor 5 is started and, due to short circuiting of the line, it tends to increase in speed. The counter E. M. F. generated by the motor is in opposition to the E. M. F. in the circuit, and therefore a current suitable for welding, is maintained in the circuit.

When the metal electrode 8 is raised in order to draw an arc the added resistance of the arc causes the motor to slow down. The counter E. M. F. is decreased, and the E. M. F. of the line will force approximately the same amount of current through the added resistance of the welding arc, due to the fact that the counter E. M. F. has fallen. Thus it is sufficient that an approximately constant current is maintained in the welding circuit, making a weld without burnt places, globules or pitting, which are due to variations in the current. This approximately constant current is due to the reactance of the idle motor, controlled by a suitable governor.

The less the resistance of the arc, the greater the speed of the motor and the greater the reactance of the counter E. M. F. The E. M. F. forcing the current through the circuit is the difference between the E. M. F. of the line and the counter E. M. F. of the motor and this is practically constant, due to the fact that the counter E. M. F. increases with the increase in speed of the motor, which decreases when more resistance is at the welding point. As the current varies as the voltage, a constant current will therefore be maintained.

The speed of the motor is controlled by a mechanical governor on the motor 5, shown more particularly in Figs. 2 and 3. The governor shown is a form of centrifugal governor, but any suitable governor may be used. In this arrangement, a stationary band 10 is provided, which is held to the motor casing by means of bracket arms 11 and coaxial with the motor. Governor arms 12 are pivoted to a disk 13 on the motor shaft 14, and these arms carry at their outer ends brake shoes 15 which are adapted to engage the inner face of the band, when the arms are thrown out by a predetermined speed of the motor shaft. These arms are normally drawn inward by coil springs 16 which are arranged between the arms and adjusting screws 17 on the disk. By means of the screws the tension of the springs may be varied. Each arm is limited in its outward movement by a pin 18 on the disk, the pin being adapted to be engaged by a lug 19 on the arm. When the speed of the motor becomes excessive the arms 12 are thrown outward to cause the brake shoes to engage the band 10, which will cause friction and increased work on the part of the motor.

The brake is preferably designed so that it will function but very lightly and therefore with negligible current loss under normal welding or arcing conditions, this being controlled by the tension of the springs which control the response of the brake shoes to the centrifugal force produced at the critical motor speed for normal welding operations. While I have illustrated this brake as a centrifugally controlled mechanical brake, it will be understood that any equivalent brake device may be substituted which will function substantially in the manner above described.

I claim:

1. In combination with an electrical circuit and a direct current dynamo interposed therein, an arcing circuit branched on the first named circuit, a motor arranged in series in the arcing circuit, a governor for controlling the speed of the motor, and a stabilizer in the arcing circuit.

2. In combination with an electrical circuit carrying a direct current, an arcing circuit branched on the first named circuit, a motor arranged in series in the arcing circuit, and a governor for controlling the speed of the motor.

3. In combination with an electrical circuit energized by a direct current dynamo, an arcing circuit branched on the first named circuit, and a motor arranged in series in the arcing circuit, and a stabilizer in the arcing circuit.

4. In combination with a direct current dynamo, of an arcing circuit branched therefrom, and a series motor in the arcing circuit and driven by the current in the said circuit.

5. In an electrical arc arcing system, the combination with a source of electromotive force and an arcing circuit, of a series motor in series with the arcing circuit, the reactance of the armature of the series motor opposing the E. M. F. of the source and retaining the amperage in the arcing circuit approximately constant.

6. In an electrical arc arcing system, the combination with a source of electromotive force and a normally open arcing circuit branched thereon and adapted to be closed by the contact of the electrode with the work, and a series motor in the arcing circuit, the counter electromotive force of the series motor opposing the electromotive force of the source and maintaining the amperage in the arcing circuit approximately constant.

JOSEPH ANDREW HOLIFIELD.